Patented July 29, 1941

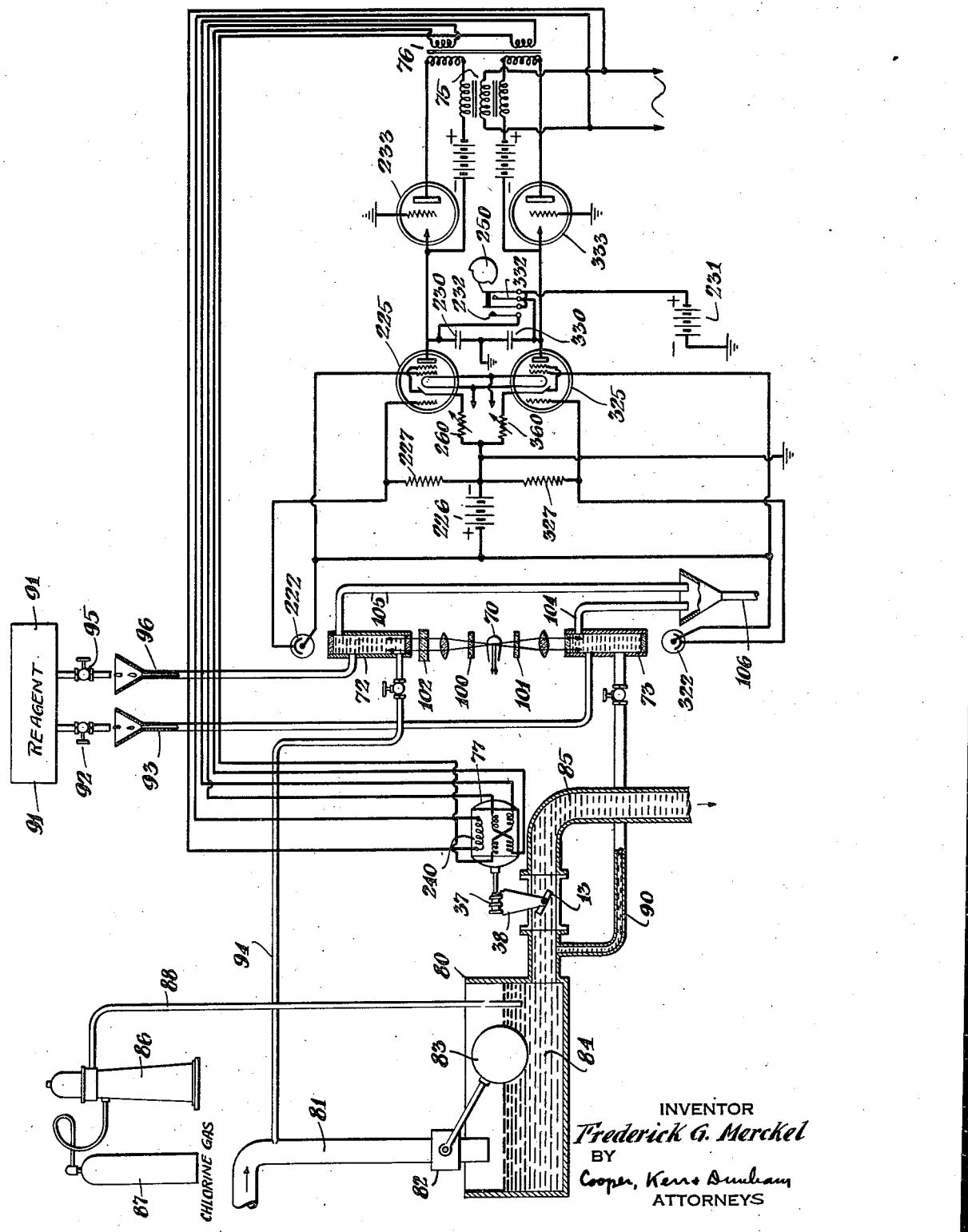

2,251,149

UNITED STATES PATENT OFFICE 2,251,149

METHOD OF PURIFYING WATER AND TREATING LIQUIDS

Frederick G. Merckel, Montclair, N. J., assignor to Wallace & Tiernan Products, Inc., Belleville, N. J., a corporation of New Jersey Application May 23, 1939, Serial No. 275,247

5 Claims. (Cl. 210—28)

This invention relates to the treatment of water or other fluids for controlling the content of material therein in the form of suspended particles or in solution, and finds important utilization in the purification of water for human consumption or for employment in arts in which, for example, a content of solid or dissolved material, or both, is to be maintained below or above a predetermined value, or is to be maintained more or less constant between predetermined limits, as for instance, the residual content of chlorine in water or sewage after chlorination.

Among other objects the invention has for its purpose to provide reliable methods efficiently and automatically removing solid matter from water; and for efficiently and automatically carrying out kindred procedures of fluid treatment. Other objects and advantages will appear as the invention is hereinafter disclosed.

While other forms of apparatus may be employed in carrying my invention into practice, certain preferred apparatus is illustrated in the drawing, which is a diagrammatic view of apparatus whereby the procedure of the invention may be applied to a treatment, such as chlorination.

The invention is particularly applicable to other treatments, as in the purification of water and the like, wherein the treatment is such as not to substantially modify the volume of liquid traversing the treating system.

For instance, the drawing shows a purification system, for water, sewage or other liquids, wherein the purification is obtained by chlorination. Thus in the drawing, the purifying apparatus may conveniently comprise a treatment chamber 80 into which the water, for example, is introduced through a pipe 81, having its outlet to the chamber controlled by valve 82 which is operated by a ball float 83 so as to maintain a constant level of the water 84 in the tank. The chamber has an outlet pipe 85, through which the water may be withdrawn for use; and for control purposes as hereinafter described, the outlet line may be provided with a throttling valve or the like, e. g. a butterfly valve 13 adapted to be displaced by a worm-segment 38 upon rotation of a worm 37 which meshes with the segment. For purification of the water as it traverses the chamber, there is provided, for example, a chlorinator 86 supplied from a cylinder of chlorine 87 and adapted to introduce chlorine at a predetermined and fixed rate to the water 84 through a line 88. Although other types may be used in some cases, a vacuum feed chlorinator is particularly useful, for example, chlorinators of the character disclosed in United States Patent No. 1,514,939, issued November 11, 1924, upon application of Charles F. Wallace.

It will be understood that the valve 13 controls the flow of liquid from the treatment chamber 80 and thereby controls the rate, i. e. the extent, of treatment. There is provided a device for scanning the effluent and for automatically controlling the valve 13, through suitable translating mechanism, in accordance with the chlorine content of the scanned effluent so as to maintain the condition of the effluent substantially constant or uniform as predetermined and desired.

For photoelectrically scanning the effluent from the water-purifying system to detect variations of light corresponding to changes in chlorine content of the treated liquid, a light source 70 is provided, to direct light through a sampling chamber or cell 73, to which a sample stream of the effluent is directed from the pipe 85 by a sampling pipe 90. A suitable indicator may conveniently be introduced in the sampled effluent, so as to provide a color response in accordance with the content, for example, of residual chlorine. Thus there may be provided a tank 91 containing a supply of re-agent, such as ortho-tolidin in solution, and the re-agent is fed, preferably very slowly, through a pre-settable valve 92 into a line 93 which opens into the sampling chamber 73. It will be understood that when ortho-tolidin is added to a fluid in which there is unconsumed or residual chlorine present, a reaction takes place such as to develop a characteristic yellow color, the density of the color being a measure of the amount of residual chlorine in the fluid.

Although in some cases, the effluent control, whereby the rate of purification treatment is varied in response to detected variations in the condition of the treated effluent, may be effected by means of a single photo cell and controlling system of the sort shown in my Patent No. 2,204,225, issued June 11, 1940, the control may be efficiently attained by using an additional photo-electric unit in parallel for scanning a standard, (i. e. control) light-modifying device. Although other means may be employed, such as a confined liquid of selected color value, or simpler means for effecting a predetermined reduction in the light passed, it has been found convenient to employ, for example, a standard element 102 comprising a colored glass disk of predetermined density, arranged for illumination by the light source 70. There may also be disposed in the path of the light through the standard 102, an additional sampling chamber 72, adapted to receive a sample of the unpurified water through a line 94 leading from the input pipe 81. Although not essential in all cases, it is ordinarily preferable to balance out any undesirable effects caused by turbidity or which a re-agent such as ortho-tolidin may produce with other substances than chlorine which might be present in the water; and to that end, a supply of the re-agent from the tank 91 is conveniently introduced through a valve 95 and line 96 to the cell 72, at the same slow rate as in the case of its addition to the treated water in cell 73.

Inasmuch as it is ordinarily desirable to maintain the residual chlorine content at a predetermined low amount, say 0.2 part per million (for drinking water, and as measured in the effluent as it traverses the pipe 85), whereby the desired purification is obtained without waste of chlorine gas, the control system is conveniently arranged so as to operate the valve 13 only when the color difference between the cells 73 and 72 departs from a predetermined extent corresponding to the desired quantity of residual chlorine. Thus if the liquid in cell 73 is too yellow, in contrast to the combined color of the standard 102 and the liquid in cell 72, the control system (for example as hereinafter described) is such as to open the valve 13 in the effluent line and hence permit the water to traverse the purifying system at a greater rate; and vice versa, if the degree of yellowness of the water in cell 73 is less than the predetermined amount with respect to the parallel control set-up (comprising the standard 102 and cell 72), the valve 13 is proportionally closed, so as to decrease the rate of passage of the water through the purifying system and permit it to receive more chlorine per unit quantity.

For the described control, a photoelectrically controlled circuit is illustrated in the drawing. A pair of light-responsive devices, preferably photoelectric cells 222, 322, are respectively mounted at the ends of the sampling chambers 72, 73, to receive light projected from the source 70 through the chambers and intermediate lens systems and the instrumentalities hereinabove described. The photoelectric cells 222, 322 are respectively connected in series with the resistances 227, 327 and a common supply battery 226, and the voltage drops across the resistances are respectively impressed on the control grids of the screen grid electron amplifier tubes 225, 325, whose heaters are supplied with the usual heating current from a source not shown. A condenser 230 is connected across the plate circuit of the tube 225 and is connected to the B battery 231 when the contacts 232 are closed; and a condenser 330 is likewise connected across the plate circuit of the tube 325, and when contacts 332 are closed, to the battery 231. When the contacts 232 and 332 are closed, the battery 231 charges the condensers and when the two sets of contacts are open, each condenser discharges through its associated tube (225 or 325) at a rate dependent upon the voltage on the control grid of such tube.

The condenser 230 is also connected across the grid-cathode of the grid glow or gas discharge tube 233, and the condenser 330 is connected across the grid-cathode of a like tube 333,—so that the grid of each of the tubes 233, 333 is maintained below (i. e. more negative than) its activating potential until the charge has sufficiently leaked off the associated condenser through the corresponding one of the tubes 225, 325. When this has occurred in the case of either grid glow tube, it becomes activated and current flows in its output circuit, which includes a secondary of the transformer 75 as hereinafter described.

The cam contacts 232, 332 are operated by a cam 250 (driven, for example, by a synchronous motor, not shown), and in such fashion that repeatedly, both sets of contacts are open, together, for a predetermined active or control period and are closed for a succeeding period of non-controlling character.

It will now be seen that the time it takes each of the condensers 230, 330 to discharge to the point of activation of the corresponding one of the relay tubes 233, 333, is a function of the current through the corresponding resistance 227 or 327 and is thus a function of the amount of light impinging on the corresponding photo cell 222 or 322. Thus if both cells receive the same amount of light, both relay tubes 233, 333 will become activated at substantially the same instant in the period that the contacts 232, 332 are open, and thus there will be no unbalance between the output circuits of the relay tubes at any time in such period and no operation of the instrumentalities hereinafter described for adjusting the valve 13. However if the photo cells receive different amounts of light, the tubes 225, 325 will have different voltages on their control grids, the condensers will discharge at different rates, and one of the tubes 233, 333 will be activated ahead of the other in the stated period. Thus for a time having a duration governed by the amount of light difference, one or the other of the output circuits (depending on the direction of light difference) will have a current flow while the other does not, and there will be a corresponding operation of the instrumentalities described below, for adjustment of the valve 13 in a direction to reduce the light difference.

The output circuit of each of the tubes 233, 333 contains a corresponding secondary winding of a modulating transformer 75 and a corresponding primary winding of a transformer 76. The primary of the transformer 75 is connected to a suitable supply (not shown) of alternating current, which supplies also the main winding 240 of the motor 77. The motor, preferably of the reversible shading coil type, may be employed to operate the effluent throttling valve 13 for controlling the rate of flow of the treated material through the purification chamber. The secondary windings of the transformer 76 are so connected to the shading coils of the shading coil motor 77 as to cause the rotor of the motor to operate the valve 13 toward closed position when the sampled effluent in cell 73 is less yellow than the control color value of the standard 102 as modified by the liquid in the balancing cell 72, and to cause the rotor to operate the valve 13 toward open position when the sampled effluent is more yellow than the control color value. In this way, the effluent is automatically maintained substantially at the desired standard condition of purity, e. g. at the desired standard content of residual chlorine.

It will be understood that the cam 250 is operated in suitable manner, for example such that it is continuously rotated at ¼ R. P. M. and it connects the battery 231 to the contacts 232, 332 for three minutes out of every four. The motor 77 may be like that shown in Fig. 2 of copending application Serial No. 74,895, filed April 17, 1936, by John R. MacKay, and similarly connected.

It will also be understood that although it is now preferred to employ a battery in series with each secondary winding of the transformer 75 (as shown), so as to obtain thereby substantially full wave modulation of the plate current supplying the tubes 233 and 333, it is possible in some cases to dispense with these batteries entirely and still effectively control the motor 77; but omission of the batteries may result in some reduction in sensitivity, since the plate current will then flow in the circuit of the activated tube only during the positive alternation of each cycle of the line current.

The control arrangements shown have various advantages, including freedom from derangement by variation in intensity of the light source 70 due to ageing or line voltage changes, and the combination is sensitive, rugged, and adapted effectively to operate a valve as shown or a recorder or other instrumentalities (not shown).

While in some cases a buffer tube, preferably a low grid current electron tube operated below ionization voltage on any electrode, may be advantageously employed between each photo cell 22, 222, 322 and its associated tube 25, 225, 325, the drawing, for the sake of simplicity in disclosure, shows only the simpler arrangements.

The tubes 225, 325 are respectively self-biased, as by means of variable resistors 260, 360 respectively, from the same source of potential 231 which is used for charging the condensers 230, 330. With the specific arrangement illustrated, it will be understood that the biasing resistance 260 is initially so adjusted in relation to the adjustment of biasing resistance 360, that when the color of the sampled effluent in cell 73 has the predetermined standard equivalence or other relation (corresponding to the desired purity as indicated by the content of residual chlorine) to the detected color of the standard 102 and the liquid in the cell 72, the condensers 230 and 330 discharge at the same rate, and there is no movement of the motor 71, or valve 13.

It will also be appreciated that in some cases, the cell 72, instead of being connected as shown, may merely contain a static body of liquid having the precise color which is to be developed in the sampling cell 73 when the residual chlorine content is as desired; under such circumstances, the standard 102 may be omitted and the adjustments of the biasing resistance are then, of course, such as to afford a variation in the rate of discharge of condenser 330, relative to the rate of discharge of condenser 230, only when the color of the water in sampling cell 73 departs from the standard color in cell 72. Ordinarily, moreover, the sensitivity of control is enhanced by the interposition of suitable colored filters 100, 101, intermediate the light source 70 and the cells 72, 73, respectively. Indeed, in the use of orthotolidin, the actual variation in transmission of yellow rays by the scanned solutions (corresponding to variation of chlorine content) may be relatively small, but rays of other wave length emitted by the light source 70 are greatly impeded by the selective action of the sample liquid and have their transmission effected greatly by small variations in color resulting from slight changes in the residual chlorine content. Accordingly, it is usually preferable under such circumstances to make the filters 100, 101 of a blue or blue-violet glass or solution, such color being sufficiently distinct from the yellow portion of the visible spectrum as to afford great sensitivity. Similar results may be obtained by omitting the filters and using a monochromatic light source of suitable wave length, such as a mercury vapor lamp or the like.

In the system shown, the relatively small effluent from the sampling cells 72 and 73 may be conveniently passed to waste, through pipes 104, 105 and 106.

Although the illustrated system has been described in connection with the purification of water, such as drinking water, it will be understood that it is well adapted for other purification purposes, such as the chlorination of sewage in plants for the disposal of the latter.

The described procedural steps and apparatus may be applied to other treatments than those specifically described hereinabove, and are of particular advantage for similar treatments wherein the volume of liquid is not substantially modified by the treatment. Great sensitivity of control is an inherent advantage of the present invention, and another special advantage resides in the fact that if the treating system is deranged, the arrangement may conveniently be such as automatically to cut off the delivery of liquid from the system. Thus, in the case of water purification systems, the arrangement is biased, so to speak, on the side of safety; for example, if in the arrangement shown the supply of chlorine becomes exhausted, the valve 13 is automatically adjusted to cut off the delivery of water,—thus avoiding the health hazard of an inadvertent delivery of unchlorinated water.

As stated, like procedure can be employed in other treatments, for instance, in automatic chemical control for water softening, pH correction, iron removal, addition of sedimentation agents, and other treatments wherein the results of treatment are optically detectable in the effluent i. e., treatments intended either to remove or introduce suspended matter or color, and likewise treatments wherein the addition of an indicator to the effluent results in similar variation of a light intercepting characteristic in response to the effect of the treatment. The invention is of greatest advantage in treatments, such as filtration, sedimentation, cooking or other heating treatments, and the like, wherein the treatment, once initiated, depends for its results on the length of time that the liquid is subjected to treatment.

It will be understood that the rate of intermittent scanning may be varied to suit the particular treatment involved,—for instance, by suitably proportioning and timing the cam 250 (the hereinabove described arrangement of a control cycle of one minute in each four minutes of operation, being set forth only by way of example).

This application is a continuation in part of my copending application, Serial No. 87,627, filed June 27, 1936 (renewed November 23, 1938).

What is claimed is:

1. In a method of controlling the rate of flow of a liquid through a purifying system wherein the liquid is purified without substantial change in its volume, by addition of a chemical, and wherein the results of purification treatment are optically detectable in the effluent of treated liquid from the system, the steps including adding a small quantity of the chemical to the liquid in the system at a substantially constant rate, photoelectrically scanning the effluent to detect variations in the results of the purifying treatment, converting said photo-electrically scanned variations in the results of treatment into variations in electric current, and converting variations of the electric current into variations in the length of time in which successive quantities of the liquid are maintained in the purifying system and subjected to treatment therein, by variably throttling the effluent to maintain the results of the purification treatment, in the effluent, substantially at a predetermined desired degree.

2. In a method of controlling the rate of flow of a liquid through a purifying system for effecting purification treatment, by addition of a chemical, of which the results are optically detectable in the treated liquid, in combination, the steps of adding a small quantity of the chemical to the liquid in the system at a substantially constant rate, testing the effluent to detect variations in said results of the purification treatment, including photo-electrically detecting optical variations corresponding to said variations in results, converting said optical variations into variations in electric current, and converting variations of the electric current into variations in the rate of flow of the liquid to maintain the said optically detectable results of the purification treatment, in the effluent, substantially at a predetermined desired degree.

3. In a method of controlling the rate of flow of a liquid through a system for purification treatment thereof, by addition of a chemical, in combination, the steps of adding a small quantity of the chemical to the liquid in the system at a substantially constant rate, converting variations in the results of the purification treatment in the effluent from the system into variations of light, photo-electrically detecting said variations of light, converting said detected variations of light into variations in electric current, and converting variations of the electric current into variations in the rate of effluence of the liquid to maintain the results of the purification treatment, in the effluent, substantially at a predetermined degree.

4. In a method of controlling the rate of flow of a liquid through a treating system wherein the liquid is treated without substantial change in its volume, by addition of a chemical, and wherein the results of the treatment are optically detectable in the treated liquid, in combination, the steps of adding a small quantity of the chemical to the liquid in the system at a substantially constant rate, converting variations in the condition of the effluent from the system into variations of light, photo-electrically detecting said variations of light, converting said detected variations of light into variations in electric current, and converting variations of the electric current into variations in the rate of flow of the liquid through the system to maintain the optically detectable results of the treatment substantially at a predetermined desired degree in the effluent.

5. In a method of controlling the rate of flow of a liquid through a treating system wherein the liquid is treated by addition of a chemical and wherein the rate of treatment of the liquid is controllable by varying the rate of flow of the effluent of treated liquid from the system and wherein the results of the treatment are optically detectable in the treated liquid, in combination, the steps of adding a small quantity of the chemical to the liquid in the system at a substantially constant rate, converting variations in the condition of the effluent from the system into variations of light, photo-electrically detecting said variations of light, converting said detected variations of light into variations in electric current, and converting variations of the electric current into variations in the rate of effluence of the liquid, by variably throttling the effluent in response to said variations of current, to maintain the optically detectable results of the treatment substantially at a predetermined desired degree in the effluent.

FREDERICK G. MERCKEL.